United States Patent
Lorenz et al.

(10) Patent No.: US 11,656,711 B2
(45) Date of Patent: May 23, 2023

(54) METHOD AND APPARATUS FOR CONFIGURING A PLURALITY OF VIRTUAL BUTTONS ON A DEVICE

(71) Applicant: Cirrus Logic International Semiconductor Ltd., Edinburgh (GB)

(72) Inventors: Thomas Lorenz, Austin, TX (US); Anthony Stephen Doy, Los Gatos, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/903,898

(22) Filed: Jun. 17, 2020

(65) Prior Publication Data
US 2020/0401292 A1     Dec. 24, 2020

Related U.S. Application Data

(60) Provisional application No. 62/864,649, filed on Jun. 21, 2019.

(51) Int. Cl.
| | | |
|---|---|---|
| *G06F 3/041* | (2006.01) | |
| *G06F 3/01* | (2006.01) | |
| *G06F 3/16* | (2006.01) | |

(52) U.S. Cl.
CPC .......... *G06F 3/04142* (2019.05); *G06F 3/016* (2013.01); *G06F 3/0412* (2013.01); *G06F 3/167* (2013.01)

(58) Field of Classification Search
CPC .... G06F 3/04142; G06F 3/0412; G06F 3/167; G06F 3/0488; G06F 2203/014; G06F 3/0481; G06F 3/016–0488
See application file for complete search history.

(56) References Cited

U.S. PATENT DOCUMENTS

| | | | |
|---|---|---|---|
| 3,686,927 A | 8/1972 | Scharton | |
| 4,902,136 A | 2/1990 | Mueller et al. | |
| 5,374,896 A | 12/1994 | Sato et al. | |
| 5,684,722 A | 11/1997 | Thorner et al. | |

(Continued)

FOREIGN PATENT DOCUMENTS

| | | |
|---|---|---|
| AU | 2002347829 | 4/2003 |
| CN | 103165328 A | 6/2013 |

(Continued)

OTHER PUBLICATIONS

First Examination Opinion Notice, State Intellectual Property Office of the People's Republic of China, Application No. 201880037435.X, dated Dec. 31, 2020.

(Continued)

*Primary Examiner* — Temesghen Ghebretinsae
*Assistant Examiner* — Ivelisse Martinez Quiles
(74) *Attorney, Agent, or Firm* — Jackson Walker L.L.P.

(57) ABSTRACT

Embodiments described herein relate to methods and apparatuses for configuring a plurality of virtual buttons on a device. For example, each of the plurality of virtual buttons may be activated or deactivated based on a mode of operation of the device. By activating and deactivating different combinations of the plurality of virtual buttons depending on the mode of operation of the device, the inadvertent engagement of virtual buttons which would otherwise not be used in that mode of operation may be avoided.

23 Claims, 6 Drawing Sheets

(56) References Cited

U.S. PATENT DOCUMENTS

| | | |
|---|---|---|
| 5,748,578 A | 5/1998 | Schell |
| 5,857,986 A | 1/1999 | Moriyasu |
| 6,050,393 A | 4/2000 | Murai et al. |
| 6,278,790 B1 | 8/2001 | Davis et al. |
| 6,294,891 B1 | 9/2001 | McConnell et al. |
| 6,332,029 B1 | 12/2001 | Azima et al. |
| 6,388,520 B2 | 5/2002 | Wada et al. |
| 6,567,478 B2 | 5/2003 | Oishi et al. |
| 6,580,796 B1 | 6/2003 | Kuroki |
| 6,683,437 B2 | 1/2004 | Tierling |
| 6,703,550 B2 | 3/2004 | Chu |
| 6,762,745 B1 | 7/2004 | Braun et al. |
| 6,768,779 B1 | 7/2004 | Nielsen |
| 6,784,740 B1 | 8/2004 | Tabatabaei |
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,333,604 B2 | 2/2008 | Zernovizky et al. |
| 7,392,066 B2 | 6/2008 | Hapamas |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 | 9/2010 | Tierling et al. |
| 7,825,838 B1 | 11/2010 | Srinivas et al. |
| 7,979,146 B2 | 7/2011 | Ullrich et al. |
| 3,068,025 A1 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Shasha et al. |
| 8,593,269 B2 | 11/2013 | Grant et al. |
| 8,648,659 B2 | 2/2014 | Oh et al. |
| 8,648,829 B2 | 2/2014 | Shahoian |
| 8,659,208 B1 | 2/2014 | Rose et al. |
| 8,754,757 B1 | 6/2014 | Ullrich et al. |
| 8,754,758 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,019,087 B2 | 4/2015 | Bakircioglu et al. |
| 9,030,428 B2 | 5/2015 | Fleming |
| 9,063,570 B2 | 6/2015 | Weddle et al. |
| 9,070,856 B1 | 6/2015 | Rose et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Klippel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,039,080 B2 | 7/2018 | Miller et al. |
| 10,055,950 B2 | 8/2018 | Saboune et al. |
| 10,074,246 B2 | 9/2018 | Da Costa et al. |
| 10,102,722 B2 | 10/2018 | Levesque et al. |
| 10,110,152 B1 | 10/2018 | Hajati |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,402,031 B2 | 9/2019 | Vandermeijden et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,638 B2 | 7/2020 | Mondello et al. |
| 10,735,956 B2 | 8/2020 | Bae et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,848,886 B2 | 11/2020 | Rand |
| 10,860,202 B2 | 12/2020 | Sepehr et al. |
| 10,969,871 B2 | 4/2021 | Rand et al. |
| 10,976,825 B2 | 4/2021 | Das et al. |
| 11,069,206 B2 | 7/2021 | Rao et al. |
| 11,079,874 B2 | 8/2021 | Lapointe et al. |
| 11,139,767 B2 | 10/2021 | Janko et al. |
| 11,150,733 B2 | 10/2021 | Das et al. |
| 11,259,121 B2 | 2/2022 | Lindemann et al. |
| 11,263,877 B2 | 3/2022 | Marchais et al. |
| 11,460,526 B1 | 10/2022 | Foo et al. |
| 2001/0043714 A1 | 11/2001 | Asada et al. |
| 2002/0018578 A1 | 2/2002 | Burton |
| 2002/0085647 A1 | 7/2002 | Oishi et al. |
| 2003/0068053 A1 | 4/2003 | Chu |
| 2003/0214485 A1 | 11/2003 | Roberts |
| 2005/0031140 A1 | 2/2005 | Browning |
| 2005/0134562 A1 | 6/2005 | Grant et al. |
| 2005/0195919 A1 | 9/2005 | Cova |
| 2006/0028095 A1 | 2/2006 | Maruyama et al. |
| 2006/0197753 A1* | 9/2006 | Hotelling ............. G06F 3/0446 345/173 |
| 2007/0013337 A1 | 1/2007 | Liu et al. |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 | 4/2009 | Ullrich et al. |
| 2009/0102805 A1 | 4/2009 | Meijer et al. |
| 2009/0128306 A1 | 5/2009 | Luden et al. |
| 2009/0153499 A1 | 6/2009 | Kim et al. |
| 2009/0189867 A1 | 7/2009 | Krah et al. |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0080331 A1 | 4/2010 | Garudadri et al. |
| 2010/0085317 A1* | 4/2010 | Park ................... G06F 3/04817 345/173 |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2011/0056763 A1 | 3/2011 | Tanase et al. |
| 2011/0075835 A1 | 3/2011 | Hill |
| 2011/0077055 A1 | 3/2011 | Pakula et al. |
| 2011/0141052 A1 | 6/2011 | Bernstein et al. |

(56) References Cited

U.S. PATENT DOCUMENTS

| | | |
|---|---|---|
| 2011/0161537 A1 | 6/2011 | Chang |
| 2011/0163985 A1 | 7/2011 | Bae et al. |
| 2011/0167391 A1 | 7/2011 | Momeyer et al. |
| 2012/0011436 A1* | 1/2012 | Jinkinson ............ G06F 1/1671 715/702 |
| 2012/0105367 A1* | 5/2012 | Son ................... G06F 3/04883 345/174 |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |
| 2013/0275058 A1 | 10/2013 | Awad |
| 2013/0289994 A1 | 10/2013 | Newman et al. |
| 2013/0307786 A1 | 11/2013 | Heubel |
| 2014/0035736 A1 | 2/2014 | Weddle et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0125467 A1 | 5/2014 | Da Costa et al. |
| 2014/0139327 A1 | 5/2014 | Bau et al. |
| 2014/0176415 A1 | 6/2014 | Buuck et al. |
| 2014/0205260 A1 | 7/2014 | Lacroix et al. |
| 2014/0222377 A1 | 8/2014 | Bitan et al. |
| 2014/0226068 A1 | 8/2014 | Lacroix et al. |
| 2014/0253303 A1 | 9/2014 | Levesque |
| 2014/0292501 A1 | 10/2014 | Lim et al. |
| 2014/0300454 A1 | 10/2014 | Lacroix et al. |
| 2014/0340209 A1 | 11/2014 | Lacroix et al. |
| 2014/0347176 A1 | 11/2014 | Modarres et al. |
| 2015/0049882 A1 | 2/2015 | Chiu et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070260 A1 | 3/2015 | Saboune et al. |
| 2015/0077324 A1 | 3/2015 | Birnbaum et al. |
| 2015/0084752 A1 | 3/2015 | Heubel et al. |
| 2015/0116205 A1 | 4/2015 | Westerman et al. |
| 2015/0130767 A1* | 5/2015 | Myers .................. G06F 3/0485 345/174 |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0264455 A1 | 9/2015 | Granoto et al. |
| 2015/0268768 A1* | 9/2015 | Woodhull ............. G06F 3/0418 345/168 |
| 2015/0324116 A1 | 11/2015 | Marsden et al. |
| 2015/0325116 A1 | 11/2015 | Umminger, III |
| 2015/0339898 A1 | 11/2015 | Saboune et al. |
| 2015/0341714 A1 | 11/2015 | Ahn et al. |
| 2015/0356981 A1 | 12/2015 | Johnson et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070392 A1 | 3/2016 | Wang et al. |
| 2016/0074278 A1 | 3/2016 | Muench et al. |
| 2016/0097662 A1 | 4/2016 | Chang et al. |
| 2016/0132118 A1 | 5/2016 | Park et al. |
| 2016/0162031 A1 | 6/2016 | Westerman et al. |
| 2016/0179203 A1 | 6/2016 | Modarres et al. |
| 2016/0187987 A1 | 6/2016 | Ulrich et al. |
| 2016/0239089 A1 | 8/2016 | Taninaka et al. |
| 2016/0246378 A1 | 8/2016 | Sampanes et al. |
| 2016/0277821 A1 | 9/2016 | Kunimoto |
| 2016/0291731 A1* | 10/2016 | Liu ..................... G06F 3/04842 |
| 2016/0328065 A1* | 11/2016 | Johnson ................ G06F 3/044 |
| 2016/0358605 A1 | 12/2016 | Ganong, III et al. |
| 2017/0031495 A1* | 2/2017 | Smith .................. G06F 3/0418 |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0153760 A1 | 6/2017 | Chawda et al. |
| 2017/0168574 A1 | 6/2017 | Zhang |
| 2017/0168773 A1 | 6/2017 | Keller et al. |
| 2017/0169674 A1 | 6/2017 | Macours |
| 2017/0180863 A1 | 6/2017 | Biggs et al. |
| 2017/0220197 A1 | 8/2017 | Matsumoto et al. |
| 2017/0256145 A1 | 9/2017 | Macours et al. |
| 2017/0357440 A1* | 12/2017 | Tse ..................... G06F 3/0414 |
| 2018/0021811 A1 | 1/2018 | Kutej et al. |
| 2018/0033946 A1 | 2/2018 | Kemppinen et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1 | 6/2018 | Eke |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0194369 A1 | 7/2018 | Lisseman et al. |
| 2018/0196567 A1 | 7/2018 | Klein et al. |
| 2018/0224963 A1* | 8/2018 | Lee ..................... G06F 3/017 |
| 2018/0227063 A1 | 8/2018 | Heubel et al. |
| 2018/0237033 A1 | 8/2018 | Hakeem et al. |
| 2018/0206282 A1 | 9/2018 | Singh |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0304310 A1 | 10/2018 | Long et al. |
| 2018/0321056 A1 | 11/2018 | Yoo et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1* | 1/2019 | DeBates ................. H04M 3/42 |
| 2019/0035235 A1 | 1/2019 | Da Costa et al. |
| 2019/0227628 A1 | 1/2019 | Rand et al. |
| 2019/0044651 A1 | 2/2019 | Nakada |
| 2019/0051229 A1 | 2/2019 | Ozguner et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0102031 A1 | 4/2019 | Shutzberg et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0305851 A1 | 10/2019 | Vegas-Olmos et al. |
| 2019/0311590 A1 | 10/2019 | Doy et al. |
| 2019/0341903 A1 | 11/2019 | Kim |

(56) References Cited

U.S. PATENT DOCUMENTS

| | | |
|---|---|---|
| 2019/0384393 A1 | 12/2019 | Cruz-Hernandez et al. |
| 2019/0384898 A1 | 12/2019 | Chen et al. |
| 2020/0117506 A1 | 4/2020 | Chan |
| 2020/0139403 A1 | 5/2020 | Palit |
| 2020/0150767 A1 | 5/2020 | Karimi Eskandary et al. |
| 2020/0218352 A1 | 7/2020 | Macours et al. |
| 2020/0231085 A1 | 7/2020 | Kunii et al. |
| 2020/0313529 A1 | 10/2020 | Lindemann et al. |
| 2020/0313654 A1 | 10/2020 | Marchais et al. |
| 2020/0314969 A1 | 10/2020 | Marchais et al. |
| 2020/0401292 A1 | 12/2020 | Lorenz et al. |
| 2020/0403546 A1 | 12/2020 | Janko et al. |
| 2021/0108975 A1 | 4/2021 | Peso Parada et al. |
| 2021/0125469 A1 | 4/2021 | Alderson |
| 2021/0153562 A1 | 5/2021 | Fishwick et al. |
| 2021/0157436 A1 | 5/2021 | Peso Parada et al. |
| 2021/0174777 A1 | 6/2021 | Marchais et al. |
| 2021/0175869 A1 | 6/2021 | Taipale |
| 2021/0200316 A1 | 7/2021 | Das et al. |
| 2021/0325967 A1 | 10/2021 | Khenkin et al. |
| 2021/0328535 A1 | 10/2021 | Khenkin et al. |
| 2021/0365118 A1 | 11/2021 | Rajapurkar et al. |
| 2022/0026989 A1 | 1/2022 | Rao et al. |
| 2022/0328752 A1 | 10/2022 | Lesso et al. |
| 2022/0404398 A1 | 12/2022 | Reynaga et al. |
| 2022/0408181 A1 | 12/2022 | Hendrix et al. |

FOREIGN PATENT DOCUMENTS

| | | |
|---|---|---|
| CN | 107835968 A | 3/2018 |
| CN | 210628147 U | 5/2020 |
| CN | 114237414 A | 3/2022 |
| EP | 0784844 B1 | 6/2005 |
| EP | 2306269 A1 | 4/2011 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| IN | 201747044027 | 8/2018 |
| JP | H02130433 B2 | 5/1990 |
| JP | 08149006 A | 6/1996 |
| JP | H10184782 A | 7/1998 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |
| WO | 2020055405 A1 | 3/2020 |

OTHER PUBLICATIONS

International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051037, dated Jul. 9, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/GB2019/052991, dated Mar. 17, 2020, received by Applicant Mar. 19, 2020.
International Search Report and Written Opinion of the International Searching Authority, International Application No. PCT/GB2019/023342, dated Jun. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
International Search Report and Written Opinion of the International Searching Authority, International Application No. PCT/GB2019/050964, dated Sep. 3, 2019.
International Search Report and Written Opinion of the International Searching Authority, International Application No. PCT/GB2019/050770, dated Jul. 5, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
Invitation to Pay Additional Fees, Partial International Search Report and Provisional Opinion of the International Searching Authority, International Application No. PCT/US2020/052537, dated Jan. 14, 2021.
International Search Report and Written Opinion of the International Searching Authority, International Application No. PCT/US2020/056610, dated Jan. 21, 2021.
International Search Report and Written Opinion of the International Searching Authority, International Application No. PCT/GB2020/052537, dated Mar. 9, 2021.
Steinbach et al., Haptic Data Compression and Communication, IEEE Signal Processing Magazine, Jan. 2011.
Pezen et al., Syntacts Open-Source Software and Hardware for Audio-Controlled Haptics, IEEE Transactions on Haptics, vol. 14, No. 1, Jan.-Mar. 2021.
Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Jaijongrak et al., A Haptic and Auditory Assistive User Interface: Helping the Blinds on their Computer Operations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Weddle et al., How Does Audio-Haptic Enhancement Influence Emotional Response to Mobile Media, 2013 Fifth International Workshop on Quality of Multimedia Experience (QoMEX), QMEX 2013.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.

(56) References Cited

OTHER PUBLICATIONS

Second Office Action, National Intellectual Property Administration, PRC, Application No. 2019800208570, dated Jan. 19, 2022.
Examination Report under Section 18(3), UKIPO, Application No. GB2018051.9, dated Nov. 5, 2021.
Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.
Examination Report under Section 18(3), United Kingdom Intellectual Property Office, Application No. GB2106247.6, dated Mar. 31, 2022.
Combined Search and Examination Report under Sections 17 and 18(3), UKIPO, Application No. GB2210174.5, dated Aug. 1, 2022.
Examination Report under Sections 17 and 18(3), UKIPO, Application No. GB2112207.2, dated Aug. 18, 2022.
International Search Report and Written Opinion of the International Searching Authority, International Application No. PCT/US2022/030541, dated Sep. 1, 2022.
Vanderborght, B. et al., Variable impedance actuators: A review; Robotics and Autonomous Systems 61, Aug. 6, 2013, pp. 1601-1614.
International Search Report and Written Opinion of the International Searching Authority, International Application No. PCT/US2022/033190, dated Sep. 8, 2022.
International Search Report and Written Opinion of the International Searching Authority, International Application No. PCT/US2022/033230, dated Sep. 15, 2022.
Examination Report under Sections 17 and 18(3), UKIPO, Application No. GB2115048.7, dated Aug. 24, 2022.
Communication pursuant to Article 94(3) EPC, European Patent Application No. 18727512.8, dated Sep. 26, 2022.
Examination Report under Section 18(3), UKIPO, Application No. GB2112207.2, dated Nov. 7, 2022.
Examination Report, Intellectual Property India, Application No. 202117019138, dated Jan. 4, 2023.
Examination Report under Section 18(3), UKIPO, Application No. GB2113228.7, dated Feb. 10, 2023.
Examination Report under Section 18(3), UKIPO, Application No. GB2113154.5, dated Feb. 17, 2023.

* cited by examiner

METHOD AND APPARATUS FOR CONFIGURING A PLURALITY OF VIRTUAL BUTTONS ON A DEVICE

TECHNICAL FIELD

Embodiments described herein relate to methods and apparatus for configuring a plurality of virtual buttons on a device. For example, each of the plurality of virtual buttons may be activated or deactivated based on a mode of operation of the device.

BACKGROUND

Physical or mechanical buttons, which are sometimes called hardware or traditional buttons, typically operate through hardware components that physically move upon being pressed and which typically operate like a switch. These buttons are known in the art and are used in a variety of applications. For example, mechanical buttons may be found on the sides of current smart phones to control volume and other settings. Those buttons are readily identifiable both visually and by touch—typically they are set apart from the surrounding device surface and protrude slightly so a user can easily feel their location and engage them with a press. Softkeys and different types of virtual buttons, which are not directly engaged via moving parts of a physical button, are also known in the art. For instance, a touch-sensitive area may act as a virtual button on a smart phone display, and a familiar example of this is the implementation of a virtual keyboard on the touch screen of a smart phone. Advantageously, virtual buttons may be programmed or changed easily through the use of software. Advantageously, virtual buttons may reduce or eliminate hardware related problems experienced by physical buttons, such as mechanical failure after prolonged use, difficulty in waterproofing, and other issues known in the art. In addition to virtual buttons integrated with a touch screen, other types of virtual buttons may reside on a housing or non-screen surface of a device. For example, instead of a traditional button on a surface such as a dashboard, one may use a variety of force sensors, inductive sensors, or similar technology to create a touch-responsive area that acts as a virtual button and does not visually appear to be a traditional physical button.

US2013/0275058 discloses a handheld portable electronic device, having a display screen and a framing structure, wherein the framing structure includes a strain gauge, for detecting strain within the framing structure. Thus, gestures, such as squeezing the sides of the device, can be recognized, and can be used as inputs to control an application running on the device.

SUMMARY

According to some embodiments, there is provided a method for configuring a plurality of virtual buttons on a device. The method comprises receiving a first signal indicating a mode of operation of the device; outputting a first control signal operable to activate or deactivate each of the plurality of virtual buttons on the device respectively based on the mode of operation of the device; and responsive to receiving a second signal indicating that one of the plurality of virtual buttons that is activated has been engaged by a user of the device, outputting a second control signal operable to initiate a first haptic or audible response corresponding to the one of the plurality of virtual buttons.

According to some embodiments there is provided a control circuit for controlling a plurality of virtual buttons on a device. The control circuit is configured to receive a first signal indicating of a mode of operation of the device; output a first control signal to activate or deactivate each of the plurality of virtual buttons on the device respectively based on the mode of operation of the device; and responsive to receiving a second signal indicating that one of the plurality of virtual buttons that is activated has been enabled by a user of the device, output a second control signal operable to initiate output of a first haptic or audible response corresponding to the one of the plurality of virtual buttons.

According to some embodiments there is provided an integrated circuit comprising a control circuit for controlling a plurality of virtual buttons on a device. The control circuit is configured to: receive a first signal indicating of a mode of operation of the device; output a first control signal to activate or deactivate each of the plurality of virtual buttons on the device respectively based on the mode of operation of the device; and responsive to receiving a second signal indicating that one of the plurality of virtual buttons that is activated has been enabled by a user of the device, outputting a second control signal operable to initiate output of a first haptic or audible response corresponding to the one of the plurality of virtual buttons.

According to some embodiments there is provided a device comprising a control circuit for controlling a plurality of virtual buttons on a device. The control circuit configured to receive a first signal indicating of a mode of operation of the device; output a first control signal to activate or deactivate each of the plurality of virtual buttons on the device respectively based on the mode of operation of the device; and responsive to receiving a second signal indicating that one of the plurality of virtual buttons that is activated has been enabled by a user of the device, outputting a second control signal operable to initiate output of a haptic or audible response corresponding to the one of the plurality of virtual buttons.

Traditionally, the placement of virtual buttons on a device has been on the "front" of the device (for example, on a touch screen), or on a limited number of surfaces specifically designed for the user interface, with the remainder of the device being free from virtual buttons. By positioning the virtual buttons on a limited number of surfaces on a device, the device (which may be portable) may be easily held by a user without inadvertently engaging the virtual buttons.

Currently, devices, such as smart phones, have a single front surface that might for example be dominated by a touch screen. Other virtual buttons, such as buttons operating through the use of inductive sensors, may be placed below the touch screen to add further operability to the touch screen surface.

However, while mechanical buttons may be placed elsewhere on the device, the device is usually otherwise free from the presence of virtual buttons.

Should a user want to press a virtual button or indeed the touch screen while using the device, their hands are likely to cover at least a portion of the touch screen surface, which is also acting as a display screen, for example as illustrated in FIG. 1.

In FIG. 1, a device 100 comprises a touch display screen 101 and mechanical buttons 102a and 102b. As is illustrated, the user's hands 103 have to be over the touch display screen in order to utilize the user interface. In other embodiments, a device may be associated with industrial equipment, automobiles, or any other structure in which a mechanical or virtual button may be of use.

This configuration may be undesirable in some modes of operation of the device as it may obscure information being displayed by the touch display screen.

BRIEF DESCRIPTION OF THE DRAWINGS

For a better understanding of the embodiments, and to show how they may be put into effect, reference will now be made, by way of example only, to the accompanying drawings, in which.

EXAMPLE EMBODIMENTS OF THE PRESENT DISCLOSURE

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

DESCRIPTION

The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those of ordinary skill in the art.

Figure 1:
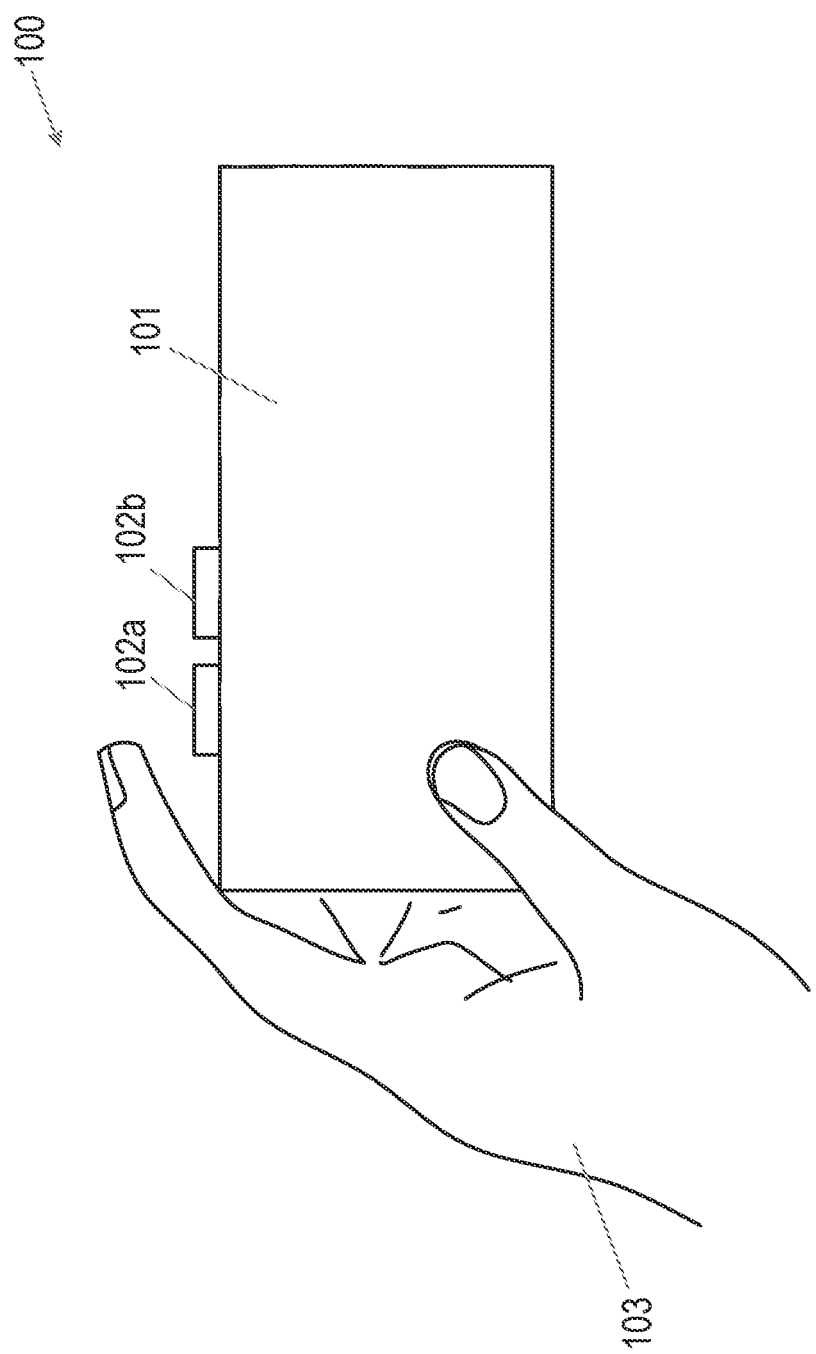
FIG. 1 illustrates a device comprising a touch display screen and mechanical buttons in accordance with the prior art.
Figure 2A:
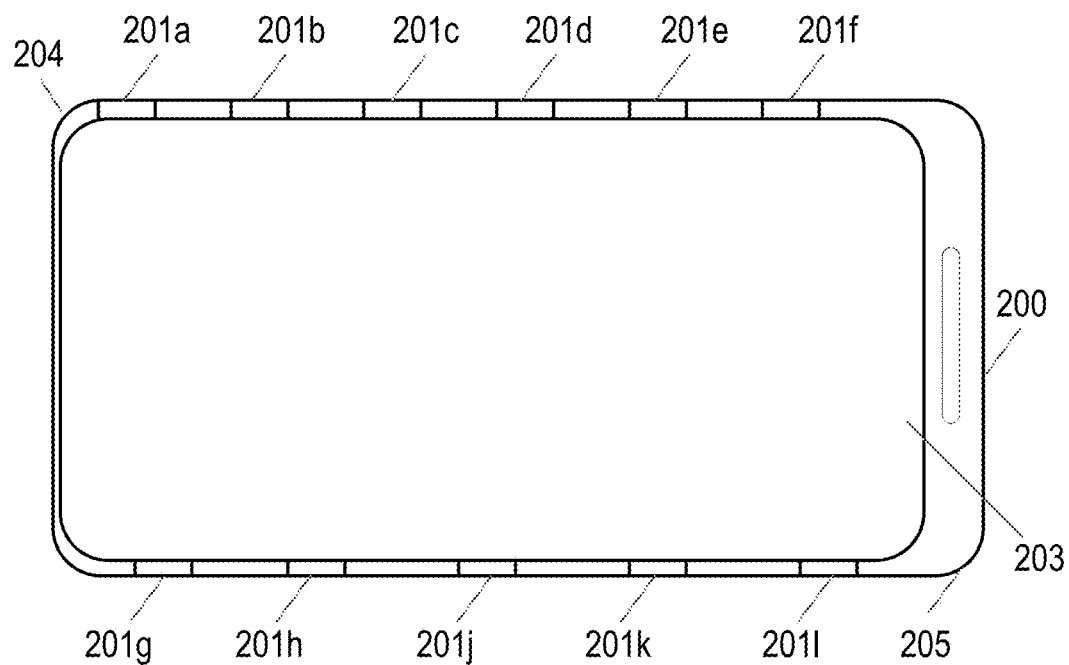
FIG. 2a illustrates a front view of a device in accordance with some embodiments.

FIG. 2a illustrates a front view of a device 200.

The device 200 comprises a touch screen display 203. The device 200 also comprises a plurality of virtual buttons 201a to 201l which, in this example, are situated along the sides of the device 200. For example, the plurality of virtual buttons 201a to 201l may be located on a non-display surface of the device 200. The non-display surface may be metallic or other materials known in the art suitable to form a housing or other structure associated with the device 200.

In this example, the device 200 comprises a smart phone, and the plurality of virtual buttons 201a to 201l are located on the sides 204 and 205 of the device 200.

Figure 2B:
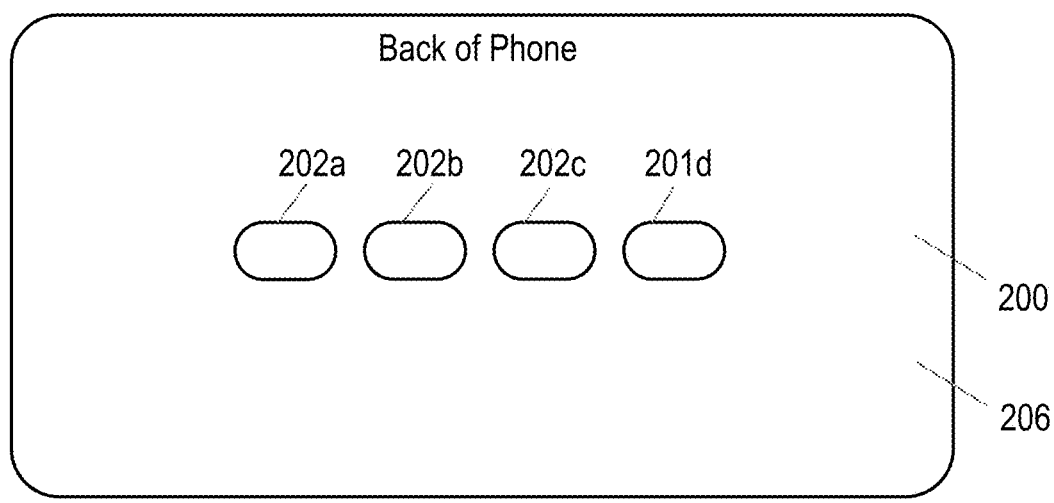
FIG. 2b illustrates a back view of a device in accordance with some embodiments.

FIG. 2b illustrates a back view of the device 200.

In this example, the back surface 206 of the device 200 comprises a plurality of virtual buttons 202a to 202d.

It will be appreciated that any surface of the device may comprise a virtual button. In particular, any non-display surface of the device may comprise a virtual button.

The virtual buttons may operate through the use of force sensors, inductive sensors, capacitive sensors, a resistive deflection sensing array, or any other mechanism configured to define a touch-sensitive area, or any combination of such mechanisms. It will be apparent that any type of virtual button used to replace a mechanical button may be used in the embodiments of this disclosure.

The plurality of virtual buttons may be visually hidden in or on the device. For example, when looking at the back or side surfaces of the device 200, a user may not be able to see the presence of the plurality of virtual buttons, and the location of the plurality of virtual buttons may not be otherwise visually or tactilely indicated. In different embodiments, the presence of the virtual buttons may be hidden only when the device is powered off. In the off state, one or more of the virtual buttons may be flush with, and otherwise visually and tactilely indistinguishable from, the rest of the device's casing or surrounding area. Upon powering on, or in specific modes of operation, however, one or more virtual buttons may be made detectable through the use of lighting, sound, or haptics (as described more fully below), or other techniques that will be apparent to those having ordinary skill in the art. Advantageously, the use of virtual buttons indistinguishable from other portions of a device in use may create a cleaner look for the device and may effectively create a highly configurable device without cluttering its physical appearance or feel, as will be more apparent with the benefit of this disclosure.

Figure 3:
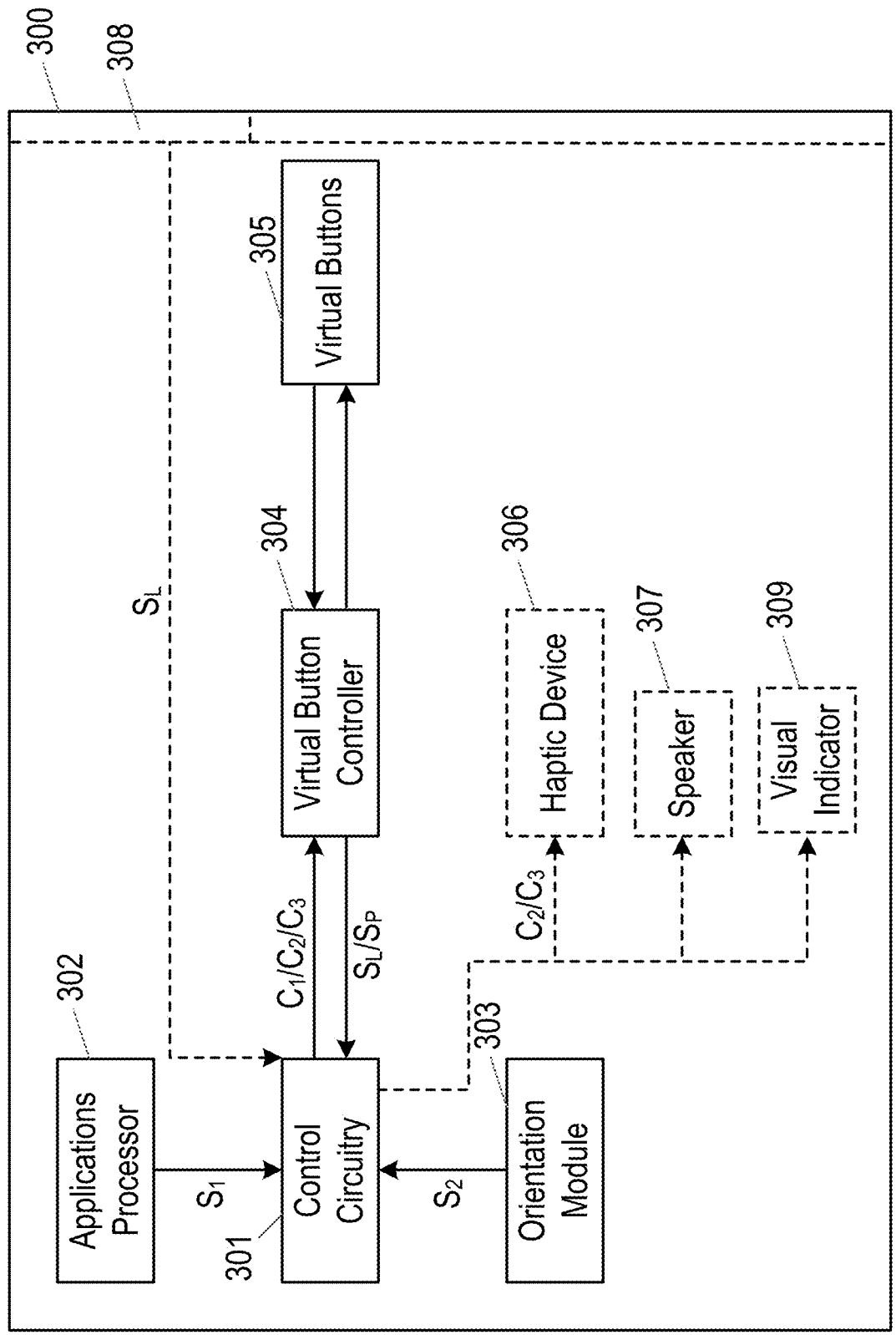
FIG. 3 illustrates a block diagram of a device in accordance with some embodiments.

FIG. 3 illustrates a block diagram of a device 300. The device 300 may comprise a plurality of virtual buttons as illustrated in FIGS. 2a and 2b.

Device 300 comprises control circuitry 301. The control circuitry 301 may be configured to communicate with an Applications Processor 302 and/or an orientation module 303. Applications Processor 302 may determine, or help determine, a mode of operation of the device as described more fully below. Orientation module 303 may be hardware and/or software based and in one embodiment may comprise an accelerometer, inertia sensor, or other sensor configured to signal a device's orientation, such as portrait or landscape mode. In other embodiments, the orientation module 303 may act more generally as a context-aware module. For example, it may determine characteristics such as whether a device is placed flat on a table, held within a purse or pocket (via a light-based sensor), being transported at high speed, etc. The control circuitry 301 may also be configured to communicate with a virtual button controller 304.

The virtual button controller 304 may be configured to control the virtual buttons 305. The virtual buttons 305 may be positioned around the device or on other surfaces, for example, as illustrated in FIGS. 2a and 2b.

Figure 4:
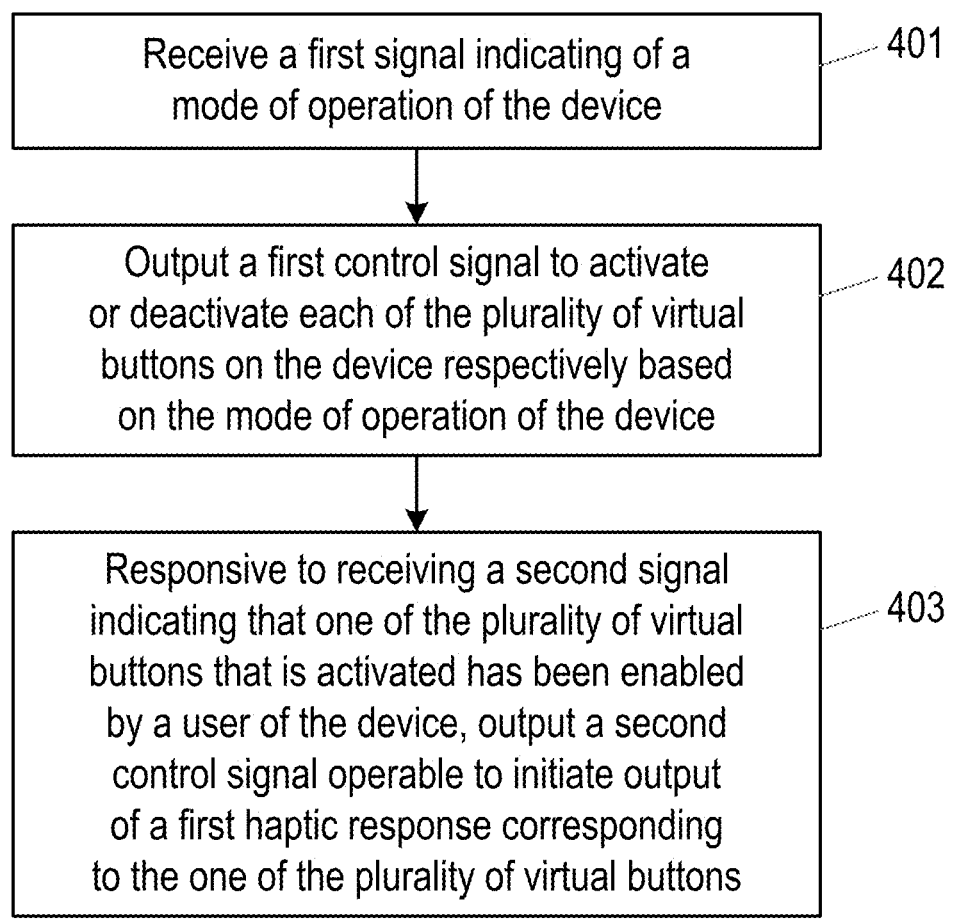
FIG. 4 illustrates a method for configuring a plurality of virtual buttons on a device.

The control circuitry 301 may be configured to perform a method as illustrated in FIG. 4.

FIG. 4 illustrates a method for configuring a plurality of virtual buttons on a device.

In step 401, the control circuitry is configured to receive a first signal indicating a mode of operation of the device. For example, the first signal may comprise a signal $S_1$ received from the applications processor 302. The first signal $S_1$ may indicate a particular application that is running on the device, for example a phone application, a gaming application, a camera application, an email application, a music playback application, a video playback application etc. In addition, the first signal $S_1$ may indicate a mode of operation in the form of a status of an application that is running on the device. For example, when an email application is running, the first signal $S_1$ may indicate whether the device display is showing a list of emails, from which the user may select one email to read, or whether the device display is showing a box in which the user may compose a new email.

The first signal may additionally or alternatively comprise a signal $S_2$ received from the orientation module 303. The signal $S_2$ may indicate the orientation of the device 300 and may originate from, for example, a gyroscope and/or an accelerometer, which may provide a corresponding signal to the orientation module 303.

In some examples, the mode of operation may additionally or alternatively comprise a user defined characteristic. For example, the mode of operation may also indicate whether or not the user is left or right handed or any setting or characteristic that is distinguishable from a different setting or characteristic during operation.

Therefore, in different embodiments, the mode of operation of the device may comprise an application running on the device, a characteristic or parameter within or associated with such application, an orientation of the device, a user defined characteristic, or other modes associated with the device or its user interface or its software as would be understood by those having ordinary skill in the art. For example, a mode of operation may be defined not only with respect to which app is being run on a device, but also with respect to one or more particular actions being taken within an individual app.

In step 402, the control circuitry is configured to output a first control signal $C_1$ to activate or deactivate each of the plurality of virtual buttons on the device based on the mode of operation of the device. If a virtual button is activated, then responsive to sensing a touch or press from a user, the virtual button may transmit a signal to the virtual button controller. If a virtual button is deactivated, then, for example, either the virtual button may be placed in a state of operation in which it does not sense the touch or press of a user, or the signals transmitted to the virtual button controller may be completely or partially ignored as a result of the deactivated state of the virtual button.

For example, when a virtual button is deactivated, if the deactivated virtual button is touched or pressed by a user, then there may be no operation performed by the device in response.

By activating and deactivating different combinations of the plurality of virtual buttons depending on the mode of operation of the device, the inadvertent engagement of virtual buttons which would otherwise not be used in that mode of operation may be avoided. Additionally, combinations of virtual buttons may be activated or deactivated together to create unique user interfaces. For example, two or more adjoining or nearby virtual buttons may be activated together, that is, within a predetermined time of each other, and those activated buttons may act in concert to implement a different user interface feature, such as a virtual scroll bar as discussed more fully below. In such an embodiment, a user may swipe across the group of virtual buttons that, together, act as one larger button to scroll content on a screen or some other functionality.

The first control signal $C_1$ may be output to the virtual button controller 304, which may control an operation state of the plurality of virtual buttons. The virtual button controller 304 may, for example, place the plurality of virtual buttons in an activated or deactivated state in response to the control signal $C_1$, or may ignore signals received from virtual buttons which are deactivated by the control signal $C_1$.

For example, referring to the example illustrated in FIGS. 2a and 2b, responsive to the first signal $S_1/S_2$ indicating that the device is operating in a gaming mode and is orientated as illustrated in FIGS. 2a and 2b, the first control signal $C_1$ may be configured to activate virtual buttons 201a, 201f, 202a and 202d, and deactivate buttons 201b, 201c, 201d, 201e, 201g, 201h, 201j 201k, 201l, 202b and 202c. However, should the first signal $S_1/S_2$ indicate that the device is operating in the gaming mode but is orientated with the virtual buttons 201a to 201f closer to the earth, then the first control signal $C_1$ may be configured to activate virtual buttons 201g, 201l, 202a and 202d, and deactivate buttons 201a, 201b, 201c, 201d, 201e, 201f, 201h, 201j, 201k, 202b and 202c.

It will be appreciated that in some modes of operation, all of the plurality of virtual buttons may be deactivated. For example, when the device is not in use (for example when no applications are actively running on the device), it may be desirable for all of the virtual buttons to be deactivated. Determining the context of the device in this regard may be facilitated by the orientation module 303 of FIG. 3.

In step 403, the control circuitry 301 is configured to, responsive to receiving a second signal $S_L$ indicating that one of the plurality of virtual buttons that is activated has been enabled by a user of the device, output a second control signal, $C_2$ operable to initiate output of a first haptic or audible or visual response corresponding to the one of the plurality of virtual buttons. In this embodiment, enabling a button refers to the button being pressed or otherwise touched or activated to initiate a responsive action associated with the device or software running on the device. In a typical embodiment, enabling a virtual button would be akin to pressing a mechanical button, the response to which would be to initiate an action. In other embodiments, however, enabling a virtual button may depend on the degree or the type of press or contact from a user. For example, enabling a button may depend on the amount of pressure applied—a "hard" press may create a different response than a "soft" press, and many different pressure levels may be detected, each of which may be correlated to a different response. In other embodiments, virtual buttons may be enabled via one or more touch gestures (for example, swipe, pinch, tap, two-finger tap, etc.) that may be configured for different responses. More generally, embodiments of this disclosure contemplate any such enablement or activation or similar effect as would be apparent by those having ordinary skill in the art.

In some examples, a first haptic response may be provided that is associated with one or more of the plurality virtual buttons. According to some embodiments, a haptic response may be any tactile sensation generated in or on the device, and preferably one designed to create an impression that the virtual button itself generated such sensation. In one embodiment, a haptic response may be generated by one or more vibrating motors or linear resonant actuators (LRAs) or similar devices. As is known in the art, haptic responses may be tailored to simulate mechanical button clicks and a host of other sensations including various surface textures, and all such techniques may be used in the embodiments of this disclosure. In other examples, a first haptic response may be provided by a separate haptic device 306. In some examples, a first audible response is provided by a speaker 307. In some examples, a first haptic response and first audible response may be provided together. In other embodiments, a visual response may be provided by a visual indicator 309. For example, the visual response may be fashioned by using LED or other lighting at or near the location of a virtual button to, for example, signal that such button has been enabled or that it has been enabled in a certain manner. A virtual button may be enabled by a user when the user in some way touches or presses the location of the virtual button on the surface of the device.

The first haptic, audible, and/or visual response may be configured to indicate a location of the one of the plurality of virtual buttons that has been activated.

For example, returning to FIGS. 2a and 2b, when a user places a device into, for example, a gaming mode of operation, they may then use their fingers to locate the activated virtual buttons on the back surface and side surfaces of the device 200. As the user will be looking at the touch screen 203 when utilizing the device 200 in this configuration, it may not be practical in this particular embodiment to utilize visual cues to notify the user as to the location of the activated virtual buttons.

In step 403, when the user locates the activated virtual button, the user may be notified that they have found the appropriate location on the surface by the first haptic response.

In some examples however, the location of some or all virtual buttons may additionally or alternatively be notified to a user by an indentation or pattern on the surface of the device, or by some other physical trait of the device, that may be felt by the user at the location of the virtual button.

In some examples, virtual buttons may be provided in conjunction with a touch screen. For example, the side surfaces 204 and 205 of device 200 may comprise a touch screen 308, as may the back surface. As a user moves their finger along the touch screen to the location of the one of the plurality of virtual buttons, the touch screen 308 may be configured to transmit the second signal $S_I$ to the control circuitry indicating that one of the plurality of virtual buttons that is activated has been enabled by a user of the device. In this example, the virtual button may be enabled by the user placing this finger in the correct position on the surface of the device.

In some examples, one or more of the plurality of virtual buttons may be sensitive to different types of engagement by the user. For example, a virtual button may be able to distinguish between the user touching the location of the virtual button and the user applying pressure to the location of the virtual button.

In this example, the activated virtual button may therefore be capable of more than one mode of engagement.

Therefore, in step 403, the second signal $S_L$ may indicate that one of the plurality of virtual buttons that is activated has been engaged by a user of the device in a first mode of engagement. For example, the one of the plurality of virtual buttons is engaged in the first mode of engagement when the user touches the location of the one of the plurality of virtual buttons without applying any additional pressure, or with a level of pressure below a particular threshold.

As discussed previously, the first haptic response may then indicate a location of the one of the plurality of virtual buttons to the user.

In some examples, the control circuitry may be configured to, responsive to receiving a third signal $S_p$ indicating that the one of the plurality of buttons has been engaged by a user of the device in a second mode of engagement, output a third control signal $C_3$ operable to initiate a second haptic or audible or visual response corresponding to the one of the plurality of virtual buttons. In some examples, a second haptic response may be provided by the one of the plurality virtual buttons. In other examples, the second haptic response may be provided by a separate haptic device 306. In some examples, a second audible response is provided by a speaker 307. In some examples, a second visual response is provided by a visual indicator 309. In some examples, two or more of a second haptic response, a second audible response, and a second visual response may be provided together.

The one of the plurality of virtual buttons may be engaged in the second mode of engagement when the user applies pressure to the location of the one of the plurality of virtual buttons. For example, the one of the plurality of virtual buttons may be engaged in the second mode of engagement when the user applies a level of pressure above a particular threshold to the location of the one of the plurality of virtual buttons.

The second haptic or audible response may be different to the first haptic or audible response, and in some examples, may simulate a click associated with a traditional or mechanical button press.

For example, when a user places a device in gaming mode as illustrated in FIG. 2a, the control circuitry may for example activate virtual buttons 201a, 201f, 202a and 202d. These activated virtual buttons may provide specific operations within the gaming mode of the device 200.

As user holding the device 200 and looking at the touch screen 203 may then locate the activated virtual buttons by running their fingers along the top side edge 204 and back of the device 200. When a finger of the user touches the location of one of the activated virtual buttons (either sensed by the activated virtual button itself or the touch screen 308), the first haptic or audible response may alert the user that they have located an activated virtual button.

In some examples, the first haptic or audible response may be provided when the user initially touches the location of the activated virtual button, and the first haptic response may not be repeated if the user continues to touch the location of the activated virtual button.

Once the user has located a virtual button that they wish to use, the user may "press" the virtual button to generate a response within the gaming mode (for example, button 201a may cause an avatar within the game to jump, whereas button 201f may cause the avatar within the game to crouch).

When the user presses the virtual button, for example, when the user applies a level of pressure above a particular threshold to the location of the virtual button, the user may be alerted that they have pressed the virtual button by the second haptic or audible response.

In some examples, a virtual button may be configured with the particular threshold and may output a signal when it detects a pressure above the particular threshold to indicate that it has been pressed. In some examples, a touch screen (e.g. touch screen) may be utilized to adjust the particular threshold. For example, the touch screen may detect that the user's finger is close to the virtual button, but not exactly on the location of the virtual button. In this case, the virtual button may still detect pressure from the user, but the virtual button may be configured to lower the level of the particular threshold in order to avoid the user having to apply more pressure in order to trigger the same threshold. The virtual button may be configured by the virtual button controller 304. The virtual button controller 304 may receive an indication of the location of the user's finger from the touch screen 308, and may provide appropriate control of the particular threshold for the virtual button in response.

It will be appreciated that different types of user interaction may trigger the different modes of engagement of a virtual button. For example, a virtual button may be engaged in a first mode of engagement by a user tapping the location, by a user touching the location of the virtual button for an elongated period of time, by a user dragging their touch across the location of the virtual button, or any other touch pattern that is distinguishable by the virtual button.

It will also be appreciated that for different modes of operation, different combinations of virtual buttons may be activated, and that in different modes of operation, the same virtual button may provide different operations.

Figure 5:
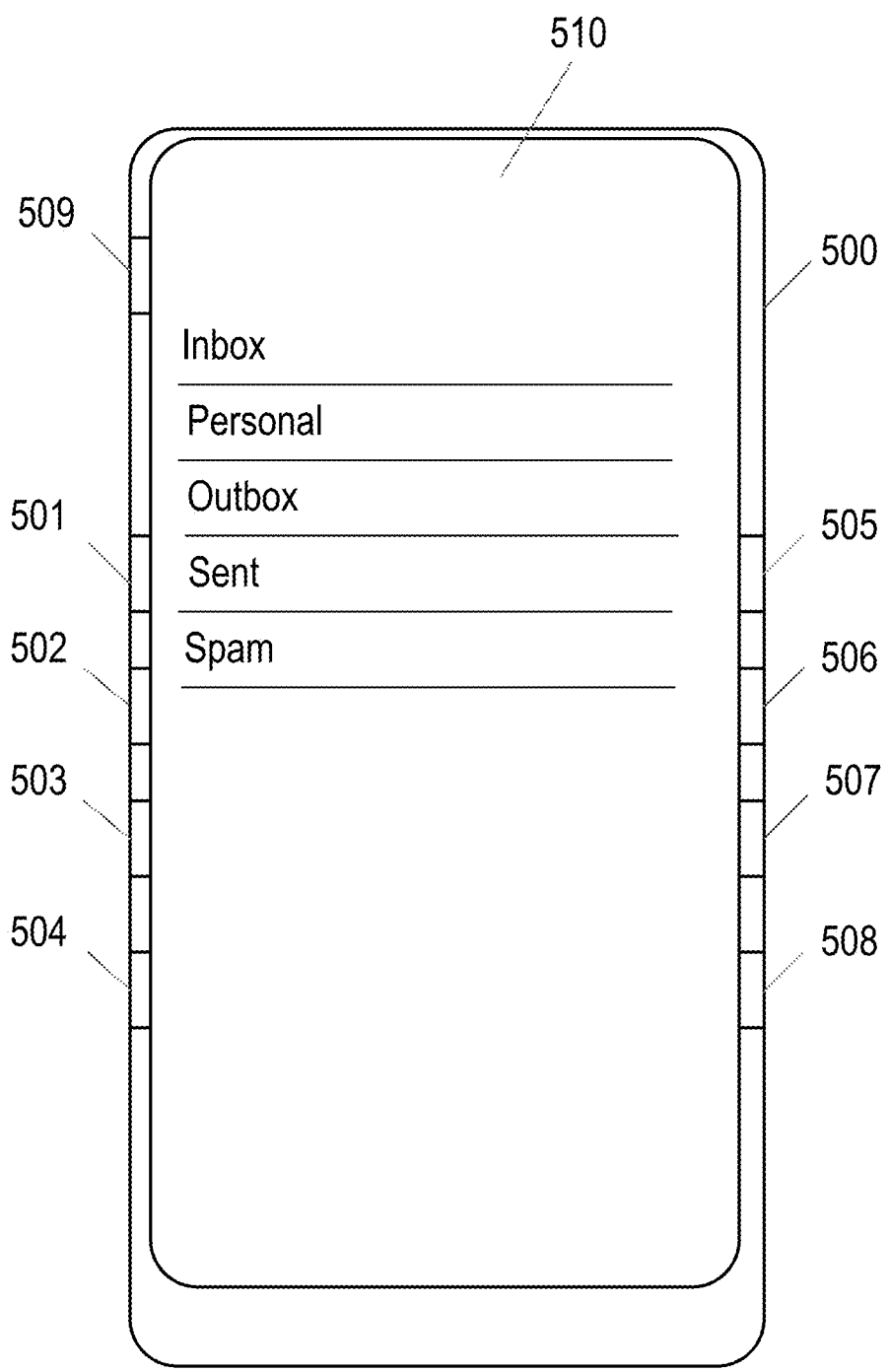
FIG. 5 illustrates an example of a device operating in an email mode of operation.

FIG. 5 illustrates an example of a device 500 operating in an email mode of operation. A display screen 510 is illustrating a list of emails.

In this example, the first signal may indicate to the control circuitry 301 that an email app has been opened, and that the device is being held in portrait mode, for example as illustrated in FIG. 5. The first signal may also indicate that the user is right or left handed.

In response to this first signal, the control circuitry may activate virtual buttons 501 to 504 if the first signal indicates that the user is left handed, and may activate virtual buttons 505 to 508 if the first signal indicates that the user is right handed. Any other virtual buttons may be deactivated (for example virtual buttons 509 and 510).

Consider an example where the user is left handed.

In this example, the grouping of virtual buttons act in concert, and the user may engage more than one of the virtual buttons within a predetermined time, for example by swiping a finger across the virtual buttons, to cause the email app to scroll up and down through a list of emails. In particular, the user may hold the device 500 in their left hand and may use their thumb to swipe up and down over the four virtual buttons 501 to 504 in turn.

The virtual buttons 501 to 504 may therefore be effectively implemented as a virtual scroll wheel, and, as the user engages each of the virtual buttons, a haptic or audible response may be provided that simulates a mechanical scroll wheel clicking as it turns.

It will be appreciated that a single virtual button may be utilized instead of the plurality of virtual buttons to similarly implement a virtual scroll wheel.

Figure 6:
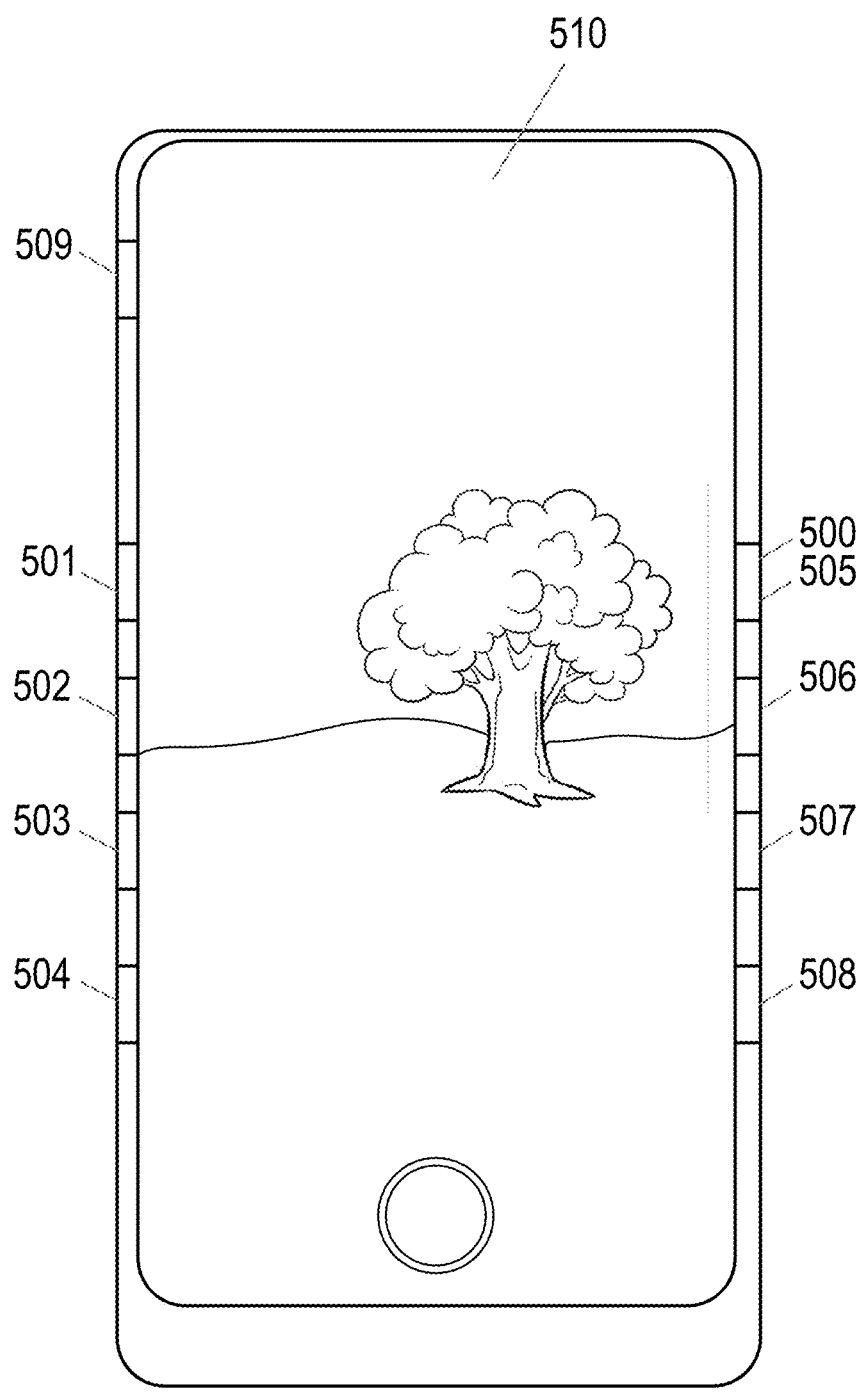
FIG. 6 illustrates an example of the device 500 operating in a camera mode of operation.

FIG. 6 illustrates an example of the device 500 operating in a camera mode of operation. The display screen 510 is displaying the image currently captured by a camera of the device.

In this example, the first signal may indicate to the control circuitry 301 that a camera app has been opened and that the device 500 is being held in portrait mode, for example as illustrated in FIG. 6.

In response to this first signal, the control circuitry may activate virtual buttons 501 to 504 and 509. The virtual buttons 505 to 508 may be deactivated.

In this example, the same virtual buttons 501 to 504 that were used to scroll up and down through a list of emails in the email mode of operation, may be used to cause the camera to zoom in and out. These virtual buttons may be engaged and a haptic or audible response may be provided as previously described with reference to FIG. 5.

In addition, in this camera mode, the virtual button 509 is activated. This virtual button may provide two modes of engagement. A first mode of engagement may be used to locate the virtual button, and the second mode of engagement may be used to cause an operation in the application on the device. In some examples, a touch screen may be formed on the surface over the virtual button 509, and may be used to locate the virtual button. For example, the virtual button 509 may be located by the user touching the location of the virtual button 509. As described with reference to FIG. 4, the control circuitry may then initiate output of a first haptic or audible response indicating to the user that the activated virtual button has been located. Once the user has located the virtual button 509, the user may engage the button (for example, to cause the camera to change mode) by applying pressure to the location of the virtual button 509. Again, as described with reference to FIG. 4, the control circuitry may then initiate output of a second haptic or audible response, where the second haptic response may simulate a button press.

It will be appreciated that the addition of the virtual buttons away from the display screen 510 of the device avoids the use of the display screen as a touch screen, thereby avoiding obscuring information displayed by the display screen 510.

Embodiments may be implemented in an electronic, portable and/or battery powered host device such as a smartphone, an audio player, a mobile or cellular phone, or a handset. Embodiments may be implemented on one or more integrated circuits provided within such a host device.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The skilled person will recognise that some aspects of the above-described apparatus and methods, for example the method as performed by the control circuitry, may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for configuring a plurality of virtual buttons on a device, the method comprising:
   receiving a first signal indicating a mode of operation of the device;
   outputting a first control signal operable to activate or deactivate each of the plurality of virtual buttons on the device respectively based on the mode of operation of the device; and
   responsive to receiving a second signal indicating that a first virtual button of the plurality of virtual buttons that is activated has been engaged by a user of the device, outputting a second control signal operable to initiate a first haptic, visual or audible response corresponding to the first virtual button;

wherein the second signal is received based on detection of pressure above a predetermined threshold on a touchscreen; and responsive to the user applying pressure that is close to, but not exactly on, the first virtual button, configuring the first virtual button to lower the predetermined threshold to avoid the user having to apply more pressure to engage the first virtual button.

2. The method of claim 1 wherein the one or more virtual buttons operate through the use of one or more of: a capacitive sensor, a force sensor, a resistive deflection sensing array or an inductive sensor.

3. The method of claim 1 wherein the first haptic, visual or audible response is configured to indicate a location of the one of the plurality of virtual buttons.

4. The method of claim 3 wherein the second signal indicates that the one of the plurality of virtual buttons that is activated has been engaged by the user of the device in a first mode of engagement.

5. The method of claim 4 wherein the one of the plurality of virtual buttons is engaged in the first mode of engagement when the user touches the location of the one of the plurality of virtual buttons.

6. The method of claim 1 wherein the method further comprises:

responsive to receiving a third signal indicating that the one of the plurality of buttons has been engaged by the user of the device in a second mode of engagement, outputting a third control signal operable to initiate a second haptic or audible response corresponding to the one of the plurality of virtual buttons.

7. The method of claim 6 wherein the one of the plurality of virtual button is engaged in the second mode of engagement when the user applies pressure to a location of the one of the plurality of virtual buttons.

8. The method of claim 6 further comprising generating the second haptic response such that the second haptic or audible response simulates a button click corresponding to the one of the plurality of virtual buttons that has been engaged in the second mode of engagement.

9. The method of claim 1 wherein the method further comprises:

responsive to receiving a plurality of second signals indicating that more than one of the plurality of virtual buttons has been engaged by the user of the device within a predetermined time, outputting a fourth control signal operable to initiate a third haptic or audible response corresponding to the more than one of the plurality of virtual buttons that have been engaged.

10. The method of claim 1 wherein the mode of operation comprises an application running on the device.

11. The method of claim 10, wherein the mode of operation comprises a status of the application running on the device.

12. The method of claim 1 wherein the second signal is received from a touch screen controller.

13. The method of claim 1, wherein the first control signal is based on a user defined characteristic.

14. A control circuit for controlling a plurality of virtual buttons on a device, wherein the control circuit is configured to:

receive a first signal indicating of a mode of operation of the device;

output a first control signal to activate or deactivate each of the plurality of virtual buttons on the device respectively based on the mode of operation of the device; and responsive to receiving a second signal indicating that a first virtual button of the plurality of virtual buttons that is activated has been enabled by a user of the device, output a second control signal operable to initiate output of a first haptic, visual or audible response corresponding to the first virtual button;

wherein the second signal is received based on detection of pressure above a predetermined threshold on a touchscreen; and responsive to the user applying pressure that is close to, but not exactly on, the first virtual button, configuring the first virtual button to lower the predetermined threshold to avoid the user having to apply more pressure to engage the first virtual button.

15. An integrated circuit comprising a control circuit for controlling a plurality of virtual buttons on a device, wherein the control circuit is configured to:

receive a first signal indicating of a mode of operation of the device;

output a first control signal to activate or deactivate each of the plurality of virtual buttons on the device respectively based on the mode of operation of the device; and responsive to receiving a second signal indicating that a first virtual button of the plurality of virtual buttons that is activated has been enabled by a user of the device, outputting a second control signal operable to initiate output of a first haptic, visual or audible response corresponding to the first virtual button;

wherein the second signal is received based on detection of pressure above a predetermined threshold on a touchscreen; and responsive to the user applying pressure that is close to, but not exactly on, the first virtual button, configuring the first virtual button to lower the predetermined threshold to avoid the user having to apply more pressure to engage the first virtual button.

16. A device comprising a control circuit for controlling a plurality of virtual buttons on the device, wherein the control circuit is configured to:

receive a first signal indicating of a mode of operation of the device;

output a first control signal to activate or deactivate each of the plurality of virtual buttons on the device respectively based on the mode of operation of the device; and responsive to receiving a second signal indicating that a first virtual button of the plurality of virtual buttons that is activated has been enabled by a user of the device, output a second control signal operable to initiate output of a haptic, visual or audible response corresponding to the first virtual button;

wherein the second signal is received based on detection of pressure above a predetermined threshold on a touchscreen; and responsive to the user applying pressure that is close to, but not exactly on, the first virtual button, configuring the first virtual button to lower the predetermined threshold to avoid the user having to apply more pressure to engage the first virtual button.

17. The device as claimed in claim 16 further comprising the plurality of virtual buttons.

18. The device as claimed in claim 17 wherein the plurality of virtual buttons are located on at least one first surface of the device.

19. The device as claimed in claim 18 wherein a second surface of the device comprises a touch screen display.

20. The device as claimed in claim 18 wherein each of the at least one first surface comprises a non-display surface.

21. The device as claimed in claim 17 wherein the device comprises one or more of: a capacitive sensor, a force sensor, a resistive deflection sensing array or an inductive sensor that are visually hidden from outside of the device when assembled, and wherein the plurality of virtual buttons are operable through the use of the one or more of: the capacitive sensor, the force sensor, the resistive deflection sensing array or the inductive sensor.

22. The device of claim 16 wherein the mode of operation of the device comprises an application running on the device.

23. The device of claim 22 wherein the mode of operation of the device comprises a status of the application running on the device.

\* \* \* \* \*